(12) United States Patent
Kiwaki

(10) Patent No.: US 9,393,839 B2
(45) Date of Patent: Jul. 19, 2016

(54) TIRE

(75) Inventor: Yukihiro Kiwaki, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 827 days.

(21) Appl. No.: 13/638,488

(22) PCT Filed: Feb. 22, 2011

(86) PCT No.: PCT/JP2011/053766
§ 371 (c)(1),
(2), (4) Date: Oct. 31, 2012

(87) PCT Pub. No.: WO2011/122170
PCT Pub. Date: Oct. 6, 2011

(65) Prior Publication Data
US 2013/0048173 A1 Feb. 28, 2013

(30) Foreign Application Priority Data

Mar. 29, 2010 (JP) ................................ 2010-075257
Mar. 29, 2010 (JP) ................................ 2010-075274

(51) Int. Cl.
*B60C 3/04* (2006.01)
*B60C 11/03* (2006.01)
(Continued)

(52) U.S. Cl.
CPC ............... *B60C 11/0304* (2013.04); *B60C 3/04* (2013.01); *B60C 11/033* (2013.04); *B60C 11/0309* (2013.04); *B60C 11/12* (2013.01);
(Continued)

(58) Field of Classification Search
CPC .... B60C 3/04; B60C 11/0304; B60C 11/032;
B60C 11/033; B60C 11/0332; B60C 2011/341; B60C 2011/0353; B60C 2011/0358; B60C 2011/0365; B60C 2011/0374; B60C 2011/0376
USPC .................. 152/209.3, 209.8, 209.9, 209.11, 152/209.12, 209.13, 453–456
See application file for complete search history.

(56) References Cited

U.S. PATENT DOCUMENTS

| 5,309,963 A | 5/1994 | Kakumu et al. |
| 2004/0055687 A1* | 3/2004 | Whitney .................. B60C 9/02 152/517 |

(Continued)

FOREIGN PATENT DOCUMENTS

| CN | 1867464 A | 11/2006 |
| CN | 101500825 A | 8/2009 |

(Continued)

OTHER PUBLICATIONS

Communication dated Mar. 12, 2015, issued by the European Patent Office in counterpart Application No. 11762410.6.

(Continued)

*Primary Examiner* — Eric Hug
(74) *Attorney, Agent, or Firm* — Sughrue Mion, PLLC

(57) ABSTRACT

The pneumatic tire 1 satisfies both SW≤175 mm and OD/SW≥3.6, where SW is the width of the pneumatic tire 1 and OD is the outer diameter of the pneumatic tire 1. Moreover, the pneumatic tire 1 satisfies both SW≤175 mm and OD/RD≤1.4, where SW is the width, OD is the outer diameter, and RD is the inner diameter of the pneumatic tire 1, which is the diameter of a portion of the pneumatic tire 1 (an end portion of a bead portion) in contact with a wheel in a state where the pneumatic tire 1 is fitted to the wheel.

7 Claims, 7 Drawing Sheets

(51) Int. Cl.
 *B60C 11/12* (2006.01)
 *B60C 11/13* (2006.01)
(52) U.S. Cl.
 CPC .......... *B60C 11/13* (2013.01); *B60C 11/0332* (2013.04); *B60C 2011/0341* (2013.04); *B60C 2011/0348* (2013.04); *B60C 2011/0358* (2013.04); *B60C 2011/0383* (2013.04); *B60C 2011/1361* (2013.04)

(56) References Cited

U.S. PATENT DOCUMENTS

2009/0255615 A1* 10/2009 Ishiyama ............ B60C 11/0302
 152/209.11
2010/0078105 A1 4/2010 Hashimoto

FOREIGN PATENT DOCUMENTS

| EP | 0 422 571 A2 | 4/1991 |
|----|----|----|
| EP | 1695843 A1 | 8/2006 |
| JP | 63-49505 A | 3/1988 |
| JP | 63-159108 A | 7/1988 |
| JP | 3-125609 A | 5/1991 |
| JP | 6-171310 A | 6/1994 |
| JP | 8-40018 A | 2/1996 |
| JP | 2000-190706 A | 7/2000 |
| JP | 2000190710 A | 7/2000 |
| JP | 2006-274049 A | 10/2006 |
| JP | 2007-168683 A | 7/2007 |
| JP | 2008-201379 A | 9/2008 |
| JP | 2008-222156 A | 9/2008 |
| JP | 2008273451 A | 11/2008 |
| JP | 2009-107471 A | 5/2009 |
| WO | 2007/114430 A1 | 10/2007 |
| WO | 2008/105363 A1 | 9/2008 |
| WO | 2008/143034 A1 | 11/2008 |
| WO | 2009/047872 A1 | 4/2009 |

OTHER PUBLICATIONS

International Search Report for PCT/JP2011/05376 filed May 31, 2011.
Japanese Official Action Letter, dated Mar. 11, 2014, issued in counterpart Japanese Patent Application No. 2010-075274.
JATMA Year Book; "Japan Automobile Tyre Manufacturers Association Standards 2007"; Jul. 20, 2007; General Incorporated Association; The Japan Automobile Tyre Manufacturers Association, Inc., 8 pages in total.
Japanese Office Action issued in Japanese Application No. 2010-075274 dated Dec. 10, 2013.
Communication dated Dec. 2, 2014 from the Japanese Patent Office in counterpart application No. 2010-75274.
"Complete Book of Automobile Engineering," Tires and Brakes: Editorial Board, Sankaido Publishing Co., Ltd., Jan. 20, 1980, vol. 12, pp. 2-3 (5 pages total).
Chinese Office Action issued in Chinese Application No. 201180017682.1 dated Jun. 27, 2014.
Communication dated Nov. 24, 2015 from the Japanese Patent Office in counterpart application No. 2014-210812.
Communication dated Nov. 24, 2015 from the Japanese Patent Office in counterpart application No. 2014-210811.
Chinese Office Action issued in Chinese Application No. 201510206275.5 dated May 27, 2016.

* cited by examiner

TIRE

CROSS REFERENCE TO RELATED APPLICATIONS

This application is a National Stage of International Application No. PCT/JP2011/053766, filed on Feb. 22, 2011, which claims priority from Japanese Patent Application Nos. 2010-075274 and 2010-075257, both filed on Mar. 29, 2010, the contents of all of which are incorporated herein by reference in their entirety.

TECHNICAL FIELD

The present invention relates to a tire which can contribute to reduction of rolling resistance.

BACKGROUND ART

Heretofore, various methods for reducing the rolling resistance of a tire have been proposed to contribute to the fuel efficiency of an automobile. For example, a method is known which uses a rubber with low rolling resistance for a tread (for example, Patent Document 1). Moreover, a method is also known which reduces rolling resistance while securing a certain level of driving stability by making the shape of a cross section of a tire in a tread width direction a distinctive shape different from general tires, and specifically by setting a ratio (TW/SW) of a tread contact width (TW) to a section width (SW) of the tire within a certain range (for example, 0.6 to 0.75) (for example, Patent Document 2).

PRIOR ART DOCUMENT

Patent Documents

Patent Document 1: Japanese Patent Application Publication No. 2006-274049 (Page 3 and FIGS. 1 and 2)
Patent Document 2: Japanese Patent Application Publication No. 2008-201379 (Page 4 and FIG. 1)

SUMMARY OF THE INVENTION

By the methods described above, the rolling resistance is reduced compared to general tires and certain contribution to the fuel efficiency of an automobile is expected. However, as consideration on the environment increases nowadays, a tire with an even higher degree of contribution to the fuel efficiency of an automobile is desired.

The present invention has been made in view of the situations described above, and an objective thereof is to provide a tire which can achieve reduction of rolling resistance by a method other than a method that uses a rubber with low rolling resistance or a method that makes the shape of a cross section in a tread width direction distinctive.

In order to solve the above-mentioned problem, the feature of the present invention is summarized as a tire having a circumferential groove portion and a lateral groove portion formed in a tread thereof, the circumferential groove portion formed continuously in a tire circumferential direction, the lateral groove portion extending in a tread width direction, wherein a width SW of the tire and an outer diameter OD of the tire satisfy SW≤175 mm and OD/SW≥3.6, and a groove area ratio which is a ratio of an area of grooves including the circumferential groove portion and the lateral groove portion to a contact patch area of the tire is 25% or less.

The angle at which the tread comes into contact with the road surface becomes smaller as the outer diameter of the tire becomes larger. Thus, on condition that the same load is applied, the tire is deformed by a larger amount when its outer diameter is larger. Accordingly, the aspect of the present invention can achieve reduction of hysteresis loss and therefore in rolling resistance.

In addition, the shape of the contact patch becomes longer in a rotation direction as the outer diameter of the tire becomes larger. Moreover, on condition that the contact patch area is the same, the rolling resistance is smaller when the width SW of the tire is smaller. Accordingly, the tire according to the present invention can achieve reduction of rolling resistance.

Meanwhile, rigidity against lateral force becomes lower as the width SW of the tire becomes smaller. To cope with this, the present invention sets the groove area ratio to 25% or less, thereby making it possible to suppress the deformation due to lateral force. Accordingly, the present invention compensates the lowered rigidity against lateral force due to the small width SW of the tire, thereby making it possible to ensure driving stability.

The tire width SW, the tire outer diameter OD, and a tire inner diameter RD may satisfy SW≤175 mm and OD/RD≤1.4, where the tire inner diameter RD is a diameter of a portion of the tire in contact with a wheel in a state where the tire is fitted to the wheel.

The groove area ratio may be 15% or less.

A plurality of the circumferential groove portions is formed, and the circumferential groove portion formed on an outer side in the tread width direction may have a larger length in the tread width direction.

A groove width of the lateral groove portion in a direction orthogonal to an extending direction of the lateral groove portion may be smaller than a length of the circumferential groove portion in the tread width direction, the lateral groove portion may be formed in a circumferential land portion defined by the plurality of circumferential groove portions, and the lateral groove portion may be formed from the circumferential groove portion toward an inner side of the circumferential land portion, and may terminate at a terminating portion within the circumferential land portion.

In the circumferential land portion, a narrow groove may be formed which communicates with the circumferential groove portion and may terminate within the circumferential land portion, and an angle of the narrow groove formed in the circumferential land portion with respect to a tread width direction line extending in the tread width direction may be 20° or less.

The lateral groove portion formed in the circumferential land portion may have a widened portion, a groove width of which is larger than the groove width of a communicating portion of the lateral groove portion with the circumferential groove portion, and the lateral groove portion may become narrower toward a terminating portion of the lateral groove portion.

In a state where the tire is mounted to a vehicle, the groove area ratio on an inner side of the vehicle with respect to a tire equator line may be larger than the groove area ratio on an outer side of the vehicle with respect to the tire equator line.

The small land portions defined by the circumferential groove portion and the lateral groove portion may be arranged side by side in the tire circumferential direction, the small land portions each may have a land-portion front surface serving as a tread surface configured to come into contact with a road surface, a land-portion side surface constituting a groove wall surface of the lateral groove portion, and a land-portion inclined surface connected to the land-portion front surface and the land-portion side surface, the land-portion inclined surface may be inclined in the tire circumferential direction and the tread width direction from the outer side toward the inner side in the tread width direction, and may have a curved surface convex toward a center of the tire in a tire radial direction, a height of the land-portion side surface which is a height from a groove bottom surface of the lateral groove portion may decrease in conformity with the inclination of the land-portion inclined surface, a connecting portion where the land-portion inclined surface and the land-portion front surface are connected to each other may have a round shape obtained by forming a curved portion convex toward an outer side in the tire radial direction, the connecting portion having the round shape may extend in such a way as to substantially coincide with the tire circumferential direction, and an extending direction of one of the connecting portions and an extending direction of another one of the connecting portions adjacent to the one connecting portion may coincide with each other.

In addition, in order to solve the above-mentioned problem, the other feature of the present invention is summarized as a tire having a circumferential groove portion and a lateral groove portion formed in a tread thereof, the circumferential groove portion formed continuously in a tire circumferential direction, the lateral groove portion extending in a tread width direction, wherein a width SW of the tire and an outer diameter OD of the tire may satisfy $SW \leq 175$ mm and $OD/SW \geq 3.6$, and a ratio of an area of the lateral groove portion to a contact patch area of the tire may be larger than a ratio of an area of the circumferential groove portion to the contact patch area.

The tire width SW, the tire outer diameter OD, and a tire inner diameter RD may satisfy $SW \leq 175$ mm and $OD/RD \leq 1.4$, where the tire inner diameter RD is a diameter of a portion of the tire in contact with a wheel in a state where the tire is fitted to the wheel.

A plurality of the circumferential groove portions may be formed, and the circumferential groove portion formed on an outer side in the tread width direction may have a larger length in the tread width direction.

A groove width of the lateral groove portion in a direction orthogonal to an extending direction of the lateral groove portion may be smaller than a length of the circumferential groove portion in the tread width direction, the lateral groove portion may be formed in a circumferential land portion defined by the plurality of circumferential groove portions, and the lateral groove portion may be formed from the circumferential groove portion toward an inner side of the circumferential land portion, and may terminate at a terminating portion within the circumferential land portion.

The lateral groove portion formed in the circumferential land portion may have a widened portion, a groove width of which is larger than the groove width of a communicating portion of the lateral groove portion with the circumferential groove portion, and the lateral groove portion may become narrower toward the terminating portion of the lateral groove portion from the widened portion.

The present invention can provide a tire which can achieve reduction of rolling resistance by a method other than a method that uses a rubber with low rolling resistance or a method that makes the shape of the cross section in the tread width direction distinctive.

MODES FOR CARRYING OUT THE INVENTION

Embodiments of a tire according to the present invention are described with reference to the drawings. Specifically, a first embodiment and a second embodiment are described.

Note that, in the following description of the drawings, same or similar reference signs denote same or similar elements and portions. However, it should be noted that the drawings are schematic, and ratios of dimensions and the like are different from actual ones. Therefore, specific dimensions and the like should be determined in consideration of the following description. Moreover, the drawings also include portions having different dimensional relationships and ratios from each other.

First Embodiment

The first embodiment of the tire according to the present invention is described with reference to the drawings. Specifically, (1) Description of Pneumatic Tire, (2) Description of Circumferential Grooves, (3) Operations and Effects, (4) Other Embodiments are described.

(1) Description of Pneumatic Tire

Figure 1:
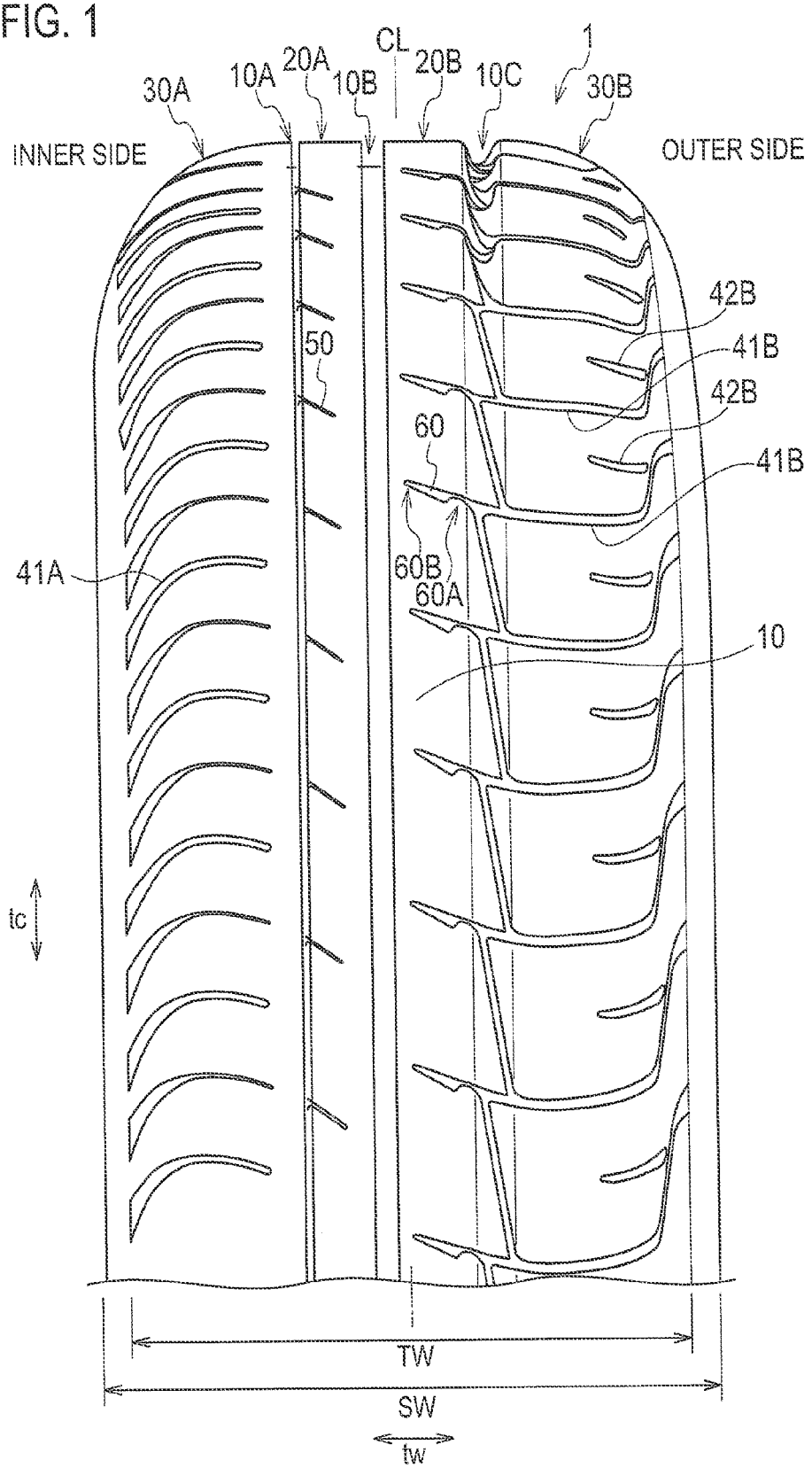
FIG. 1 is a perspective view showing part of a pneumatic tire according to a first embodiment.
Figure 2:
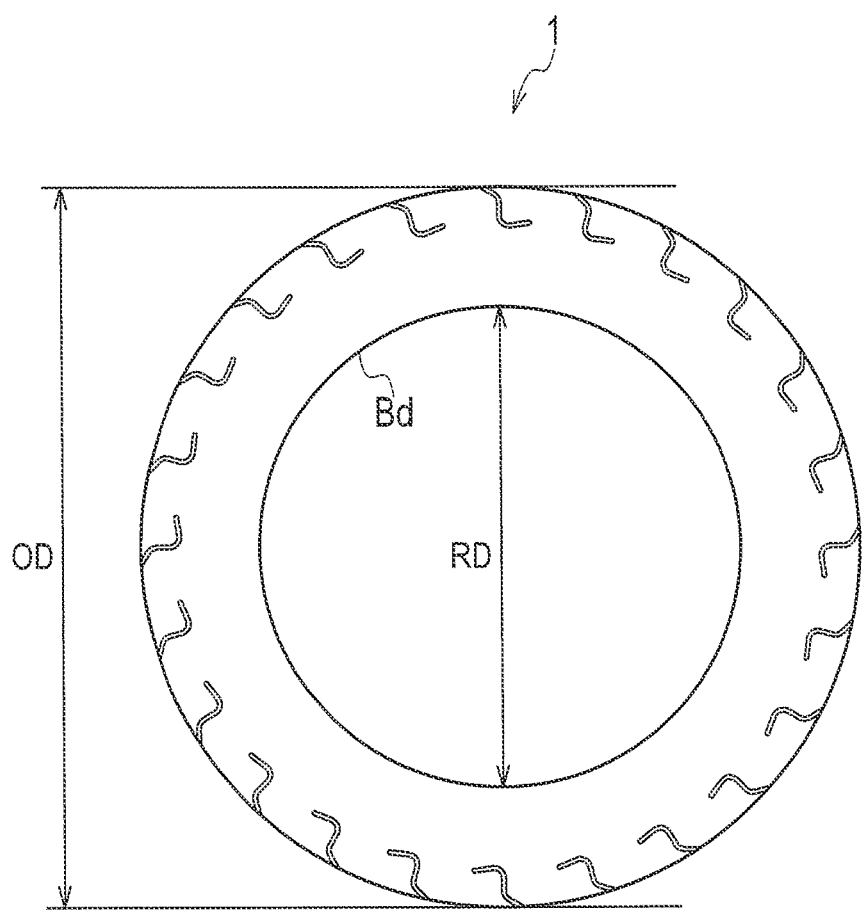
FIG. 2 is a side view of the pneumatic tire according to the first embodiment.
Figure 3:
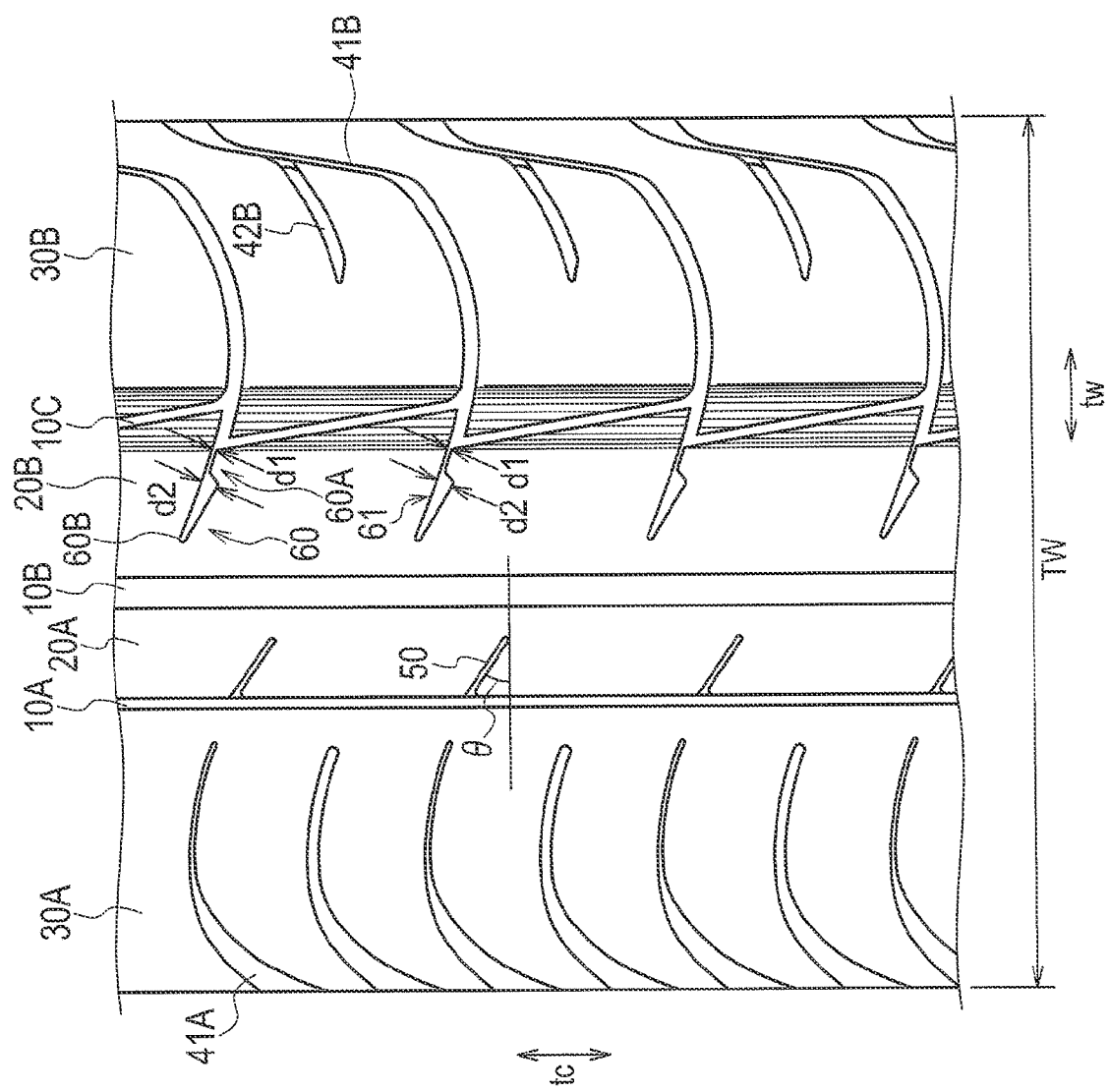
FIG. 3 is an enlarged view of part of a tread of the pneumatic tire according to the first embodiment.

The configuration of a pneumatic tire 1 according to the first embodiment of the present invention is described with reference to the drawings. FIG. 1 is a perspective view showing part of the pneumatic tire 1 according to the first embodiment. FIG. 2 is a side view of the pneumatic tire 1. FIG. 3 is an enlarged view of part of a tread of the pneumatic tire 1.

The pneumatic tire 1 includes a tread 10 configured to come into contact with a road surface. The inner configuration of the pneumatic tire 1 is the same as that of general tires including bead portion, a carcass, a belt, and the like. The outer periphery of the pneumatic tire 1 is in a toroidal shape as viewed in a cross section of the pneumatic tire 1. The pneumatic tire 1 may be filled with an inert gas such as a nitrogen gas instead of air.

Circumferential grooves 10A, 10B, and 10C that are each continuous in a tire circumferential direction tc are formed in the tread 10 of the pneumatic tire 1. The tread 10 has a circumferential land portion 20A defined by the circumferential groove 10A and the circumferential groove 10B. The tread 10 has a circumferential land portion 20B defined by the circumferential groove 10B and the circumferential groove 10C.

The pneumatic tire 1 according to the embodiment is mounted to the vehicle in a state where the circumferential groove 10A side is a vehicle inner side (referred to as inner side) and the circumferential groove 10C side is a vehicle outer side (referred to as outer side). This means that the circumferential groove 10A, the circumferential groove 10B, and the circumferential groove 10C are such that the groove formed on the outer side has a larger length in a tread width direction (groove width).

The pneumatic tire 1 is provided with a shoulder land portion 30A on the inner side of the tread 10, and a shoulder land portion 30B on the outer side. Lateral grooves 41A extending in the tread width direction are formed in the shoulder land portion 30A on the inner side. Lateral grooves 41B and sub lateral grooves 42B extending in the tread width direction are formed in the shoulder land portion 30B on the outer side.

The starting point and the ending point of each of the lateral grooves 41A are within the shoulder land portion 30A. In other words, each lateral groove 41A ends within the shoulder land portion 30A, and does not communicate with the circumferential groove 10A. Each of the lateral grooves 41B communicates with the circumferential groove 10C from the shoulder land portion 30B. Each of the sub lateral grooves 42B ends within the shoulder land portion 30B, and does not communicate with the circumferential groove 10C.

Narrow grooves 50 communicating with the circumferential groove 10A are formed in the circumferential land portion 20A. The angle of each of the narrow grooves 50 to the tread width direction line is set to 20° or less.

Lateral grooves 60 are formed in the circumferential land portion 20B. Each of the lateral grooves 60 has one end portion 60A communicating with the circumferential groove 10C, and the other end portion 60B terminating within the circumferential land portion 20B. The end portion 60A constitutes a communicating portion, and the end portion 60B constitutes a terminating portion.

As shown in FIG. 3, each lateral groove 60 includes a widened portion 61 having a groove width larger than a groove width d1 of the communicating portion (end portion 60A) with the circumferential groove 10C. A groove width d2 of the widened portion 61 is expressed as d2>d1. The groove width of the lateral groove 60 becomes smaller toward the terminating portion (end portion 60B) of the lateral groove 60 from the widened portion 61.

In a state where the pneumatic tire 1 is in contact with the ground, the lateral groove 60 functions to capture water between the pneumatic tire 1 and the road surface and send the captured water toward the circumferential groove 10C or the lateral groove 41B.

In the embodiment, the pneumatic tire 1 satisfies both SW≤175 mm and OD/SW≥3.6, where SW is the width of the pneumatic tire 1 and OD is the outer diameter of the pneumatic tire 1.

Moreover, the pneumatic tire 1 satisfies both SW≤175 mm and OD/RD≤1.4, where SW is the width, OD is the outer diameter, and RD is the inner diameter of the pneumatic tire 1, which is the diameter of a portion of the pneumatic tire 1 (an end portion Bd of a bead portion) in contact with a wheel in a state where the pneumatic tire 1 is fitted to the wheel.

In the pneumatic tire 1, a groove area ratio which is the ratio of the area of the grooves to the contact patch area is 25% or less. The grooves include the circumferential grooves 10A, 10B, and 10C, the lateral grooves 41A, the lateral grooves 41B, the sub lateral grooves 42B, and the lateral grooves 60. Here, the circumferential grooves 10A, 10B, 10C constitute circumferential groove portions, and the lateral grooves 41A, the lateral grooves 41B, the sub lateral grooves 42B, and the lateral grooves 60 constitute lateral groove portions.

The groove area ratio is more preferably 15% or less. In addition, in the pneumatic tire 1, the groove area ratio on the inner side which is an inner side of the vehicle with respect to a tire equator line CL is larger than the groove area ratio on the outer side. The groove area ratio can be adjusted by the number of the lateral grooves 41A, the lateral grooves 41B, the sub lateral grooves 42B, the lateral grooves 60, and the narrow grooves 50.

(2) Description of Circumferential Groove

Figure 4:
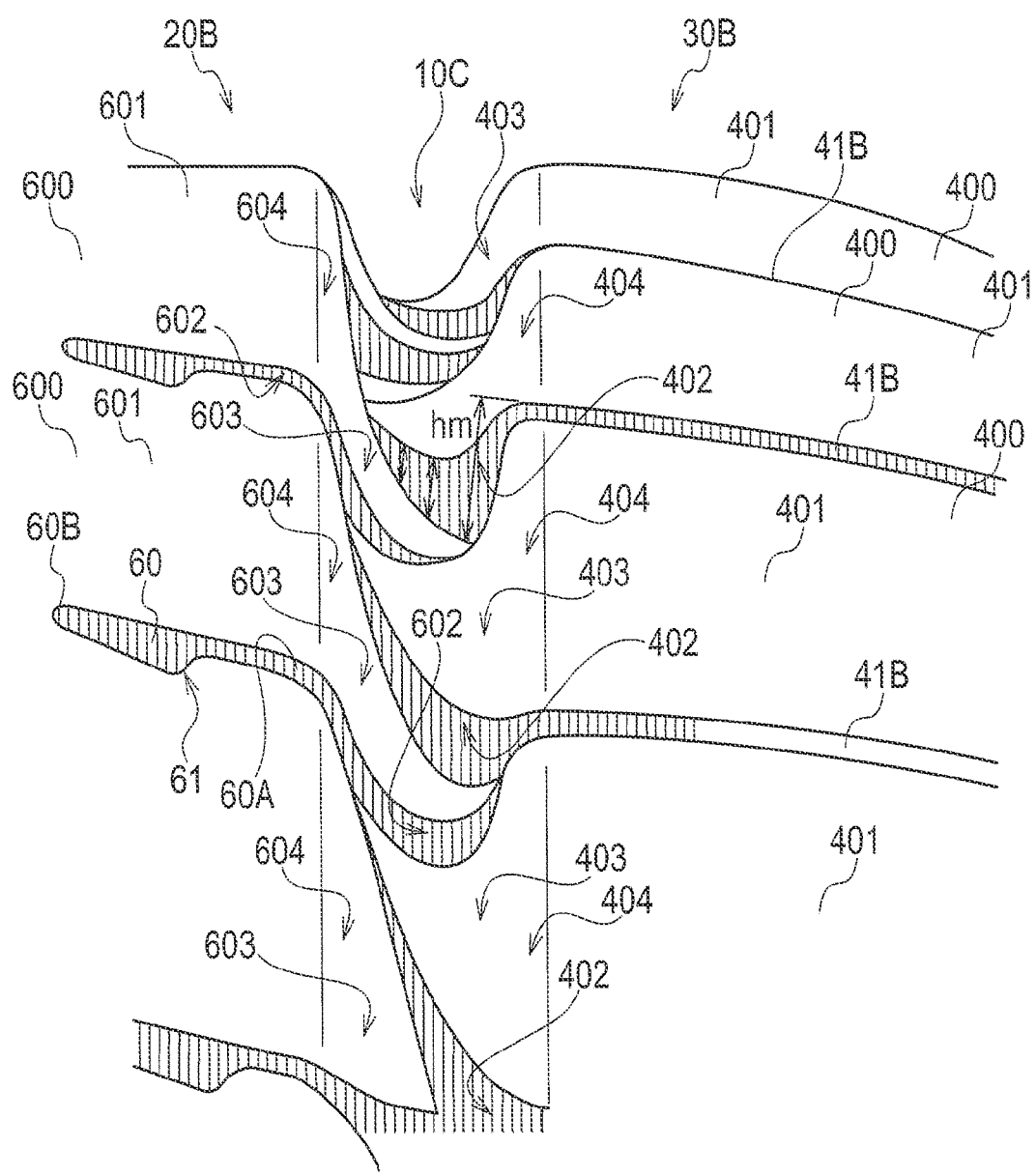
FIG. 4 is an enlarged view of a circumferential groove portion of the pneumatic tire according to the first embodiment.

FIG. 4 is an enlarged view of the circumferential groove 10C of the pneumatic tire 1 according to the first embodiment. As shown in FIG. 4, the circumferential groove 10C has multiple surfaces. The shoulder land portion 30B is defined into small land portions 400 by the lateral grooves 41B. The small land portions 400 which are repeating units in the shoulder land portion 30B each have a land-portion front surface 401 serving as a tread surface, a land-portion side surface 402 which is a side surface of the land portion, and a land-portion inclined surface 403 which forms the inside of the circumferential groove 10C. The land-portion side surface 402 constitutes a wall surface of the lateral groove 41B.

The land-portion inclined surface 403 is an inclined surface inclined in the tire circumferential direction and the tread width direction from the outer side toward the inner side in the tread width direction, and is connected to the inner side (tire equator line side) of the land-portion front surface 401. The land-portion inclined surface 403 has a curved surface which is convex toward the center of the tire in a tire radial direction. A height hm of the land-portion side surface 402 of the small land portion 400 from a groove bottom decreases along the tire circumferential direction in conformity with the inclination of the land-portion inclined surface 403.

The connecting portion between the land-portion inclined surface 403 and the land-portion front surface 401 has a round (referred to as R) shape obtained by forming a curved portion convex toward the outer side in the tire radial direction. Ridge lines in the R shape (referred to as R ridge lines 404) substantially coincide with the tire circumferential direction. The R ridge lines 404 of the adjacent small land portions 400 coincide with each other in the tire circumferential direction. In other words, an extending direction of one connecting portion and an extending direction of another connecting portion adjacent to the one connecting portion coincide with each other. The R ridge lines 404 arranged to coincide with each other in the tire circumferential direction form an opening portion of the circumferential groove 10C.

In addition, the circumferential land portion 20B is defined into small land portions 600 by the lateral grooves 60. The small land portions 600 which are repeating units in the circumferential land portion 20B each have a land-portion front surface 601 serving as a tread surface, a land-portion side surface 602 which is a side surface of the land portion, and a land-portion inclined surface 603 which forms the inside of the circumferential groove 10C.

The land-portion side surface 602 is an inclined surface inclined in the tire circumferential direction and the tread width direction from the inner side toward the outer side in the tread width direction, and is connected to the outer side of the land-portion front surface 601. The land-portion inclined surface 603 has a curved surface which is convex toward the center of the tire in the tire radial direction. The land-portion inclined surface 603 extends toward the land-portion side surface 402 of the shoulder land portion 30B.

The connecting portion between the land-portion inclined surface 603 and the land-portion front surface 601 has a round (R) shape obtained by forming a curved portion convex toward the outer side in the tire radial direction. Ridge lines in the R shape (referred to as R ridge lines 604) substantially coincide with the tire circumferential direction. In other words, an extending direction of one connecting portion and an extending direction of another connecting portion adjacent to the one connecting portion coincide with each other. The R ridge lines 604 of the adjacent small land portions 600 coincide with each other in the tire circumferential direction. The R ridge lines 604 arranged to coincide with each other in the tire circumferential direction form the opening portion of the circumferential groove 10C.

(3) Operations and Effects

The angle at which the tread comes into contact with the road surface becomes smaller as the outer diameter OD becomes larger. Thus, on condition that the same load is applied, the pneumatic tire 1 is deformed by a larger amount when its outer diameter OD is larger. Accordingly, the pneumatic tire 1 can achieve reduction of hysteresis loss and therefore rolling resistance. In addition, the shape of the contact patch becomes longer in a rotation direction as the outer diameter OD becomes larger. On condition that the contact patch area is the same, the rolling resistance is smaller when the width SW of the pneumatic tire 1 is smaller. Accordingly, the pneumatic tire 1 can achieve reduction of rolling resistance.

Rigidity against lateral force becomes lower as the width SW of the tire becomes smaller. In the pneumatic tire 1, the groove area ratio is 25% or less, and thus the contact patch area is large. This enhances the rigidity of the tread and therefore the rigidity against lateral force. Accordingly, deformation of the tread can be reduced. As described above, the pneumatic tire 1 compensates the lowered rigidity against lateral force due to the small width SW. Hence, driving stability can be ensured.

The groove area ratio is preferably 15% or less. In a case of a tire which satisfies all of SW≤175 mm, OD/SW≥3.6, and OD/RD≤1.4, a groove area ratio above 25% decreases the contact patch area and therefore lowers the driving stability.

In the pneumatic tire 1, among the circumferential grooves 10A, 10B, and 10C, the circumferential groove formed on the outer side in the tread width direction has a larger length in the tread width direction (groove width). Thus, drainage in the circumferential direction is enhanced.

In the embodiment, in the circumferential groove 10C having the largest groove width among the circumferential groove portions formed in the tread, the land-portion inclined surface 403 forming the inside of the circumferential groove 10C and the land-portion inclined surface 603 forming the inside of the circumferential groove 10C each have a curved surface which is convex toward the center of the tire in the tire radial direction and inclines gently to form the circumferential groove 10C. Thus, the rigidity of a groove wall of the circumferential groove 10C is enhanced.

In the pneumatic tire 1, the lateral grooves 41A, the lateral grooves 41B, the sub lateral grooves 42B, and the lateral grooves 60 each have one end portion terminating within a corresponding one of the circumferential land portions 20A and 20B and the shoulder land portions 30A and 30B. Thus, the lateral grooves do not separate any of the circumferential land portions 20A and 20B and the shoulder land portions 30A and 30B. This enhances the rigidity of the pneumatic tire 1 against forward-backward inputs to the tread, thereby allowing improvement of driving power and braking power.

Each lateral groove 60 includes the widened portion 61 having a groove width larger than the groove width d1 of the communicating portion (end portion 60A) with the circumferential groove 10C. The groove width of the lateral groove 60 becomes smaller toward the terminating portion (end portion 60B) of the lateral groove 60 from the widened portion 61. By decreasing the width of the terminating portion, the rigidity of the lateral grove 60 is ensured. Moreover, by decreasing the width of the terminating portion, the lateral groove 60, in the state where the pneumatic tire 1 is in contact with the ground, captures water between the pneumatic tire 1 and the road surface, and then sends the captured water toward the circumferential groove 100 or the lateral groove 41B. As a result, drainage is enhanced.

In the circumferential land portion 20A of the pneumatic tire 1, the narrow grooves 50 communicating with the circumferential groove 10A are formed. By increasing the number of the narrow grooves 50, the rigidity of the circumferential land portion 20A can be lowered. Ride comfort can be adjusted by the rigidity of the circumferential land portion 20A. In addition, the angle of the narrow grooves 50 to the tread width direction line is set to 20° or less. If the angle of the narrow grooves 50 to the tread width direction line is greater than 20°, the rigidity against lateral force is lowered.

In the pneumatic tire 1, the groove area ratio on the inner side which is the inner side of the vehicle with respect to the tire equator line CL is larger than the groove area ratio on the outer side. This can enhance the drainage of the pneumatic tire 1 in the tread width direction.

(4) Other Embodiments

As described above, the contents of the present invention have been disclosed by using the embodiment of the present invention. However, it should not be understood that the description and drawings which constitute part of this disclosure limit the present invention. From this disclosure, various alternative embodiments and examples will be apparent to those skilled in the art. For example, the embodiment of the present invention can be changed in the following ways.

The shape of the tread surface of the pneumatic tire 1 according to the embodiment, specifically the shapes of the circumferential grooves and the lateral grooves, and the like are not limited to the shapes illustrated in the drawings.

The embodiment describes the circumferential groove 10C as having a structure described with use of FIG. 4. However, the circumferential grooves 10A and 10B may have the same structure.

Second Embodiment

The second embodiment of the tire according to the present invention is described with reference to the drawings. Specifically, (1) Description of Pneumatic Tire, (2) Operations and Effects, (3) Other Embodiments are described.

(1) Description of Pneumatic Tire

Figure 5:
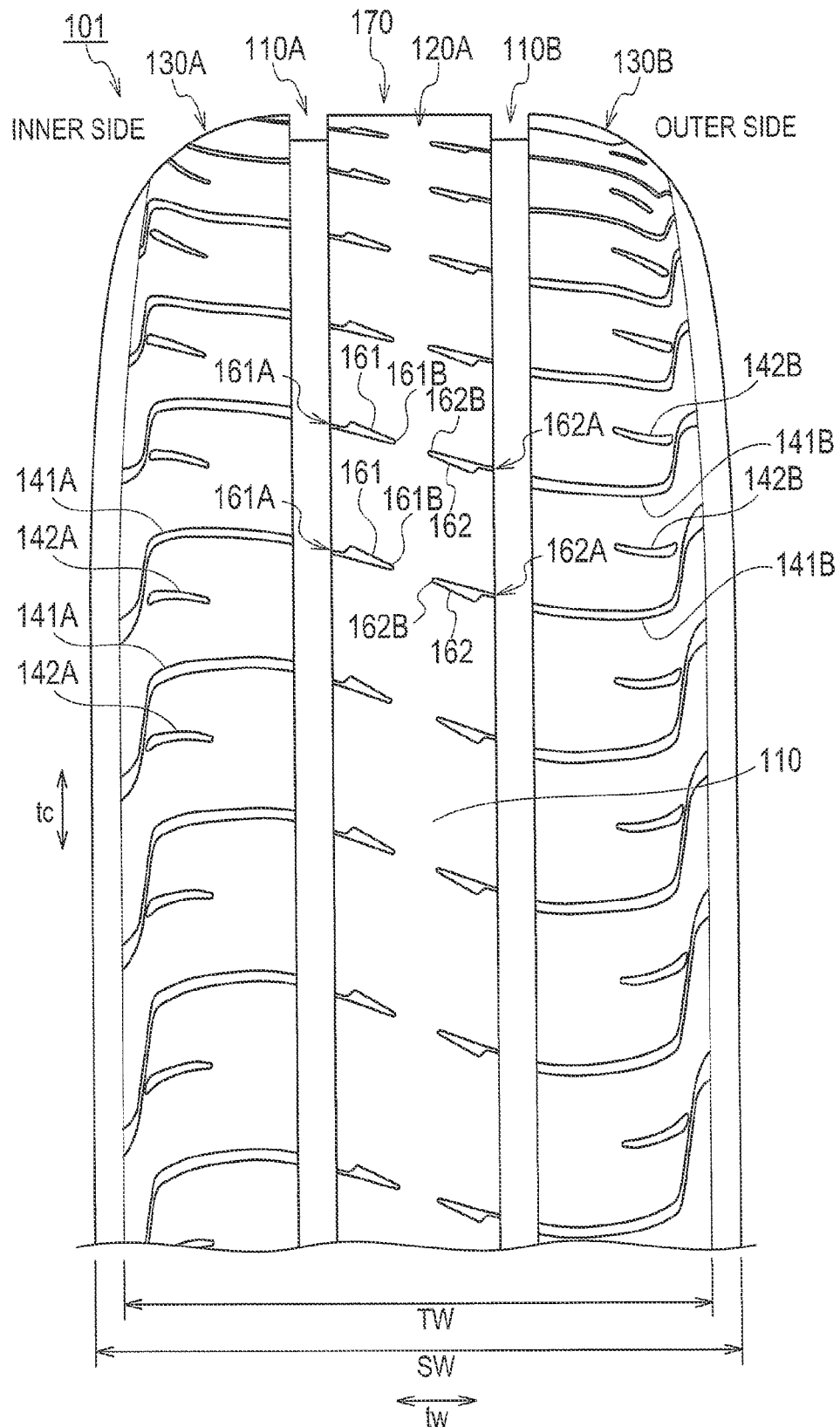
FIG. 5 is a perspective view showing part of a pneumatic tire according to a second embodiment.
Figure 6:
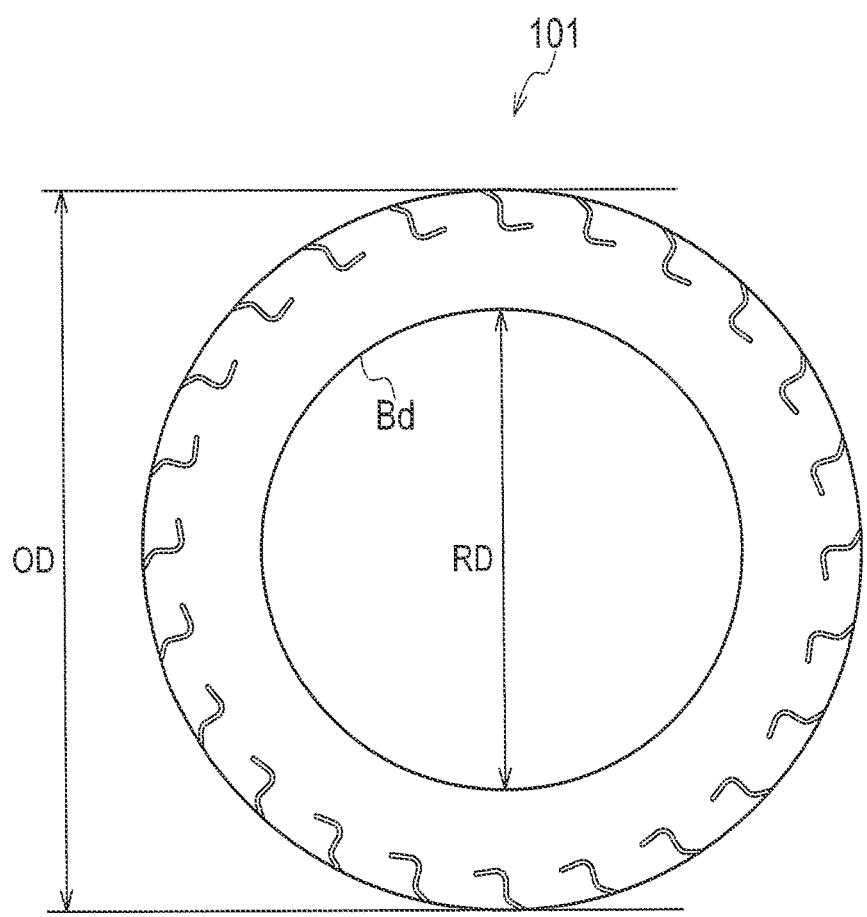
FIG. 6 is a side view of the pneumatic tire according to the second embodiment.
Figure 7:
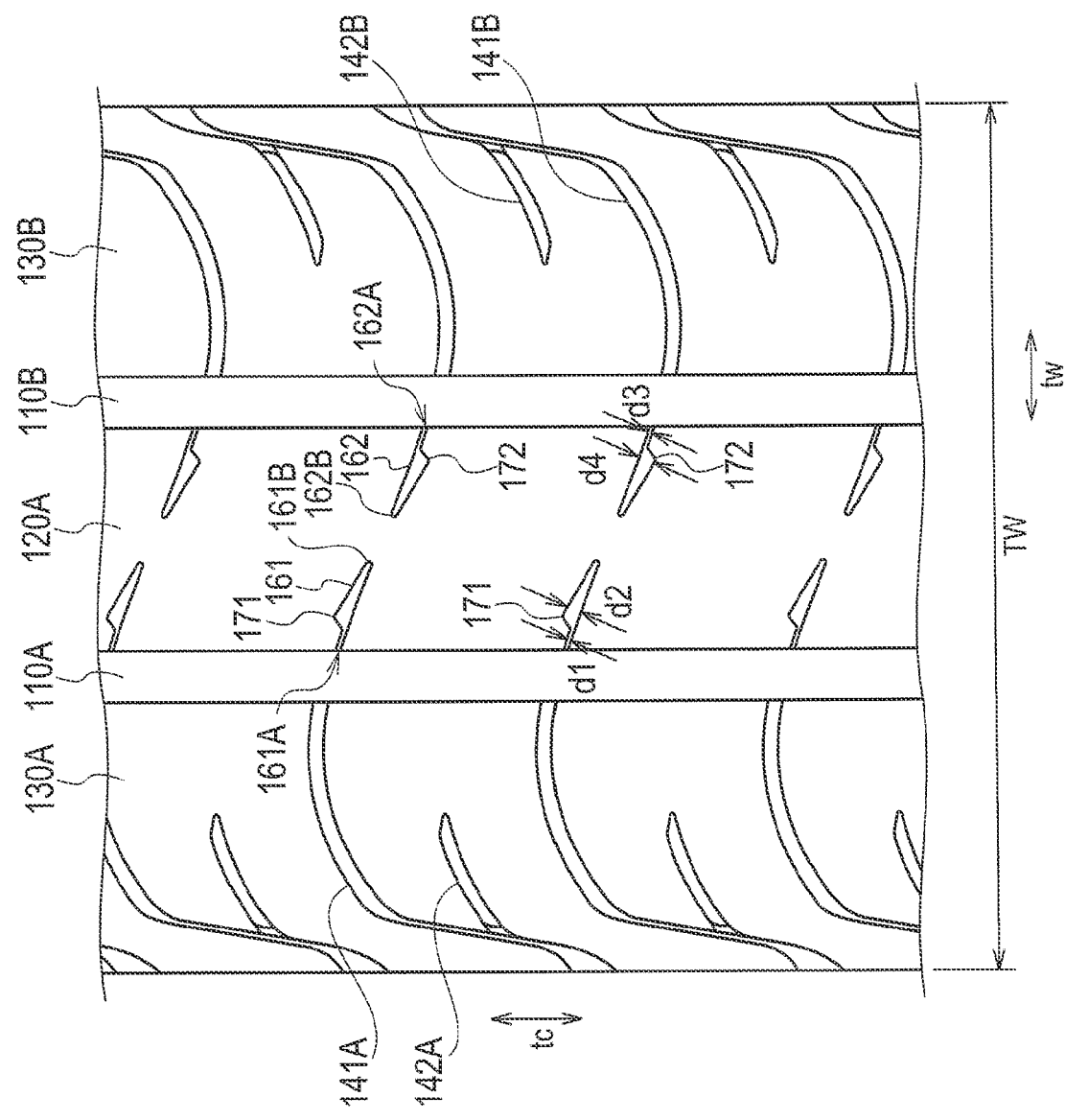
FIG. 7 is an enlarged view of part of a tread of the pneumatic tire according to the second embodiment.

The configuration of a pneumatic tire 101 according to the second embodiment of the present invention is described with reference to the drawings. FIG. 5 is a perspective view showing part of the pneumatic tire 101 according to the second embodiment. FIG. 6 is a side view of the pneumatic tire 101. FIG. 7 is an enlarged view of part of a tread of the pneumatic tire 101.

The pneumatic tire 101 includes a tread 110 configured to come into contact with a road surface. The inner configuration of the pneumatic tire 101 is the same as that of general tires including bead portions, a carcass, a belt, and the like. The outer periphery of the pneumatic tire 101 is in a toroidal shape as viewed in a cross section of the pneumatic tire 101. The pneumatic tire 101 may be filled with an inert gas such as a nitrogen gas instead of air.

Circumferential grooves 110A and 110B that are each continuous in a tire circumferential direction tc are formed in the tread 110 of the pneumatic tire 101. The tread 110 has a circumferential land portion 120A defined by the circumferential groove 110A and the circumferential groove 110B.

In the pneumatic tire 101 according to the embodiment, the circumferential groove 110A side is called a vehicle inner side (referred to as inner side) and the circumferential groove 110B side is called a vehicle outer side (referred to as outer side).

The pneumatic tire 101 is provided with a shoulder land portion 130A on the inner side of the tread 110, and a shoulder land portion 130B on the outer side. Lateral grooves 141A and sub lateral grooves 142A extending in a tread width direction are formed in the shoulder land portion 130A on the inner side. Lateral grooves 141B and sub lateral grooves 142B extending in the tread width direction are formed in the shoulder land portion 130B on the outer side.

Each of the lateral grooves 141A communicates with the circumferential groove 110A from the shoulder land portion 130A. Each of the lateral grooves 141B communicates with the circumferential groove 110B from the shoulder land portion 130B. The starting point and the ending point of each of the sub lateral grooves 142A are within the shoulder land portion 130A. In other words, each sub lateral groove 142A ends within the shoulder land portion 130A, and does not communicate with the circumferential groove 110A. Likewise, each of the sub lateral grooves 142B ends within the shoulder land portion 130B, and does not communicate with the circumferential groove 110B.

Lateral grooves 161 and 162 are formed in the circumferential land portion 120A. Each of the lateral grooves 161 has one end portion 161A communicating with the circumferential groove 110A, and the other end portion 161B terminating within the circumferential land portion 120A. The end portion 161A constitutes a communicating portion, and the end portion 161B constitutes a terminating portion. Each of the lateral grooves 162 has one end portion 162A communicating with the circumferential groove 110B, and the other end portion 162B terminating within the circumferential land portion 120A. The end portion 162A constitutes a communicating portion, and the end portion 162B constitutes a terminating portion.

As shown in FIG. 7, each lateral groove 161 includes a widened portion 171 having a groove width larger than a groove width d1 of the communicating portion (end portion 161A) with the circumferential groove 110A. A groove width d2 of the widened portion 171 is expressed as d2>d1. The groove width of the lateral groove 161 becomes smaller toward the terminating portion (end portion 161B) of the lateral groove 161 from the widened portion 171.

Each lateral groove 162 includes a widened portion 172 having a groove width larger than a groove width d3 of the communicating portion (end portion 162A) with the circumferential groove 110B. A groove width d4 of the widened portion 172 is expressed as d3≤d4 (note that d1 may be equal to d3, and d2 may be equal to d4). The groove width of the lateral groove 162 becomes smaller toward the terminating portion (end portion 162B) of the lateral groove 162 from the widened portion 172.

In a state where the pneumatic tire 101 is in contact with the ground, the lateral grooves 161 and 162 each function to capture water between the pneumatic tire 101 and the road surface and send the captured water toward the circumferential groove 110A, 110B or the lateral groove 141A and 141B.

In the embodiment, the pneumatic tire 101 satisfies both SW≤175 mm and OD/SW≥3.6, where SW is the width of the pneumatic tire 101 and OD is the outer diameter of the pneumatic tire 1.

Moreover, the pneumatic tire 101 satisfies both SW≤175 mm and OD/RD≤1.4, where SW is the width, OD is the outer diameter, and RD is the inner diameter of the pneumatic tire 101, which is the diameter of a portion of the pneumatic tire 101 (an end portion Bd of a bead portion) in contact with a wheel in a state where the pneumatic tire 101 is fitted to the wheel.

In the pneumatic tire 101, the ratio of the area of lateral groove portions to the contact patch area of the pneumatic tire 101 is set to be larger than the ratio of the area of circumferential groove portions to the contact patch area. The grooves include the circumferential grooves 110A and 110B, the lateral grooves 141A, the sub lateral grooves 142A, the lateral grooves 141B, the sub lateral grooves 142B, and the lateral grooves 161 and 162. Here, the circumferential grooves 110A and 110B constitute the circumferential groove portions, and the lateral grooves 141A, the sub lateral grooves 142A, the lateral grooves 141B, the sub lateral grooves 142B, and the lateral grooves 161 and 162 constitute the lateral groove portions.

The groove area ratio is more preferably 15% or less. The groove area ratio can be adjusted by the number of the lateral grooves 141A, the sub lateral grooves 142A, the lateral grooves 141B, the sub lateral grooves 142B, and the lateral grooves 161 and 162.

(2) Operations and Effects

The angle at which the tread comes into contact with the road surface becomes smaller as the outer diameter OD becomes larger. Thus, on condition that the same load is applied, the pneumatic tire 101 is deformed by a larger amount when its outer diameter OD is larger. Accordingly, the pneumatic tire 101 can achieve reduction of hysteresis loss and therefore rolling resistance. In addition, the shape of the contact patch becomes longer in a rotation direction as the outer diameter OD becomes larger. On condition that the contact patch area is the same, the rolling resistance is smaller when the width SW of the pneumatic tire 101 is smaller. Accordingly, the pneumatic tire 101 can achieve reduction of rolling resistance.

In addition, the ratio of the area of the lateral groove portions (lateral grooves 141A, sub lateral grooves 142A, lateral grooves 141B, sub lateral grooves 142B, lateral grooves 161 and 162) to the contact patch area of the pneumatic tire 101 is larger than the ratio of the area of the circumferential groove portions (circumferential grooves 110A and 110B) to the contact patch area, and thus, the drainage can be enhanced. Water between the tire and the road surface flows through the shortest route. For this reason, in a case where the shape of the contact patch is longer in the rotation direction as in the case of the pneumatic tire 101, increasing the groove area ratio of the lateral groove portions allows water between the tire and the road surface to be drained to the outside through a shorter route.

Therefore, the tire according to the present invention can achieve reduction of rolling resistance and enhancement of the drainage.

The groove area ratio is preferably 15% or less. In a case of a tire which satisfies all of SW≤175 mm, OD/SW≥3.6, SW≤175 mm, and OD/RD≤1.4, a groove area ratio above 25% decreases the contact patch area and therefore lowers driving stability.

In the pneumatic tire 101, the lateral grooves 141A, the sub lateral grooves 142A, the lateral grooves 141B, the sub lateral grooves 142B, and the lateral grooves 161 and 162 each have one end portion terminating within a corresponding one of the circumferential land portion 120A and the shoulder land portions 130A and 130B. Thus, the lateral grooves do not separate any of the circumferential land portion 120A and the shoulder land portions 130A and 130B. This enhances the rigidity of the pneumatic tire 101 against forward-backward inputs to the tread, thereby allowing improvement of driving power and braking power.

The lateral grooves 161 and 162 include the widened portions 171 and 172 having groove widths larger than the groove widths of the communicating portions with the circumferential grooves 110A and 110B. The groove widths of the lateral grooves 161 and 162 become smaller toward the terminating portions of the lateral grooves 161 and 162 from the widened portions 171 and 172. By decreasing the widths of the terminating portions, the rigidities of the lateral groves 161 and 162 are ensured. Moreover, by decreasing the widths of the terminating portions, the lateral grooves 161 and 162, in the state where the pneumatic tire 101 is in contact with the ground, capture water between the pneumatic tire 101 and the road surface, and then send the captured water toward the circumferential grooves 110A and 110B or the lateral grooves 141A and 141B. Accordingly, drainage is enhanced.

(3) Other Embodiments

As described above, the content of the present invention has been disclosed by using the embodiment of the present invention. However, it should not be understood that the description and drawings which constitute part of this disclosure limit the present invention. From this disclosure, various alternative embodiments and examples will be apparent to those skilled in the art. For example, the embodiment of the present invention can be changed in the following ways.

The shape of the tread surface of the pneumatic tire 101 according to the embodiment, specifically the shapes of the circumferential grooves and the lateral grooves, and the like are not limited to the shapes described in the drawings.

As described above, the present invention naturally includes various embodiments which are not described herein. Accordingly, the technical scope of the present invention should be determined only by the matters to define the invention in the scope of claims regarded as appropriate based on the description.

Note that the entire contents of Japanese Patent Application No. 2010-075257 (filed on Mar. 29, 2010) and Japanese Patent Application No. 2010-075274 (filed on Mar. 29, 2010) is incorporated herein by reference.

INDUSTRIAL APPLICABILITY

As described above, the tire according to the present invention can achieve reduction of rolling resistance by a method other than a method that uses a rubber with low rolling resistance or a method that makes the shape of the cross section in the tread width direction distinctive. Hence, the tire according to the present invention is beneficial in the field of tire manufacturing.

The invention claimed is:

1. A tire having a circumferential groove portion, a lateral groove portion, and a belt formed in a tread thereof, the circumferential groove portion formed continuously in a tire circumferential direction, the lateral groove portion extending in a tread width direction, the belt provided inside the tire, wherein a width SW of the tire, an outer diameter OD, and a tire inner diameter RD defined by a diameter of a portion of the tire in contact with a wheel in a state where the tire is fitted to the wheel, of the tire satisfy $SW \leq 175$ mm, $OD/SW \geq 3.6$, and $OD/RD \leq 1.4$, and a groove area ratio which is a ratio of an area of grooves including the circumferential groove portion and the lateral groove portion to a contact patch area of the tire is 25% or less, wherein a plurality of the circumferential groove portions are formed, and the circumferential groove portion formed on an outer side of the vehicle in the tread width direction has a larger length in the tread width direction.

2. The tire according to claim 1, wherein the groove area ratio is 15% or less.

3. The tire according to claim 1, wherein a groove width of the lateral groove portion in a direction orthogonal to an extending direction of the lateral groove portion is smaller than a length of the circumferential groove portion in the tread width direction, the lateral groove portion is formed in a circumferential land portion defined by the plurality of circumferential groove portions, and the lateral groove portion is formed from the circumferential groove portion toward an inner side of the circumferential land portion, and terminates at a terminating portion within the circumferential land portion.

4. The tire according to claim 3, wherein in the circumferential land portion, a narrow groove is formed which communicates with the circumferential groove portion and terminates within the circumferential land portion defined by the plurality of circumferential groove portions, and an angle of the narrow groove formed in the circumferential land portion with respect to a tread width direction line extending in the tread width direction is 20° or less.

5. The tire according to claim 4, wherein the lateral groove portion formed in the circumferential land portion has a widened portion, a groove width of which is larger than the groove width of a communicating portion of the lateral groove portion with the circumferential groove portion, and the lateral groove portion becomes narrower toward a terminating portion of the lateral groove portion.

6. A tire having a circumferential groove portion, a lateral groove portion, and a belt formed in a tread thereof, the circumferential groove portion formed continuously in a tire circumferential direction, the lateral groove portion extending in a tread width direction, the belt provided inside the tire, wherein a width SW of the tire, an outer diameter OD, and a tire inner diameter RD defined by a diameter of a portion of the tire in contact with a wheel in a state where the tire is fitted to the wheel, of the tire satisfy $SW \leq 175$ mm, $OD/SW \geq 3.6$, and $OD/RD \leq 1.4$, and a groove area ratio which is a ratio of an area of grooves including the circumferential groove portion and the lateral groove portion to a contact patch area of the tire is 25% or less, wherein in a state where the tire is mounted to a vehicle, the groove area ratio on an inner side of the vehicle with respect to a tire equator line is larger than the groove area ratio on an outer side of the vehicle with respect to the tire equator line.

7. A tire having a circumferential groove portion, a lateral groove portion, and a belt formed in a tread thereof, the circumferential groove portion formed continuously in a tire circumferential direction, the lateral groove portion extending in a tread width direction, the belt provided inside the tire, wherein a width SW of the tire, an outer diameter OD, and a tire inner diameter RD defined by a diameter of a portion of the tire in contact with a wheel in a state where the tire is fitted to the wheel, of the tire satisfy SW≤175 mm, OD/SW≥3.6, and OD/RD≤1.4, and a groove area ratio which is a ratio of an area of grooves including the circumferential groove portion and the lateral groove portion to a contact patch area of the tire is 25% or less, wherein small land portions defined by the circumferential groove portion and the lateral groove portion are arranged side by side in the tire circumferential direction, the small land portions each have a land-portion front surface serving as a tread surface configured to come into contact with a road surface, a land-portion side surface constituting a groove wall surface of the lateral groove portion, and a land-portion inclined surface connected to the land-portion front surface and the land-portion side surface, the land-portion inclined surface is inclined in the tire circumferential direction and the tread width direction from the outer side toward the inner side in the tread width direction, and has a curved surface convex toward a center of the tire in a tire radial direction, a height of the land-portion side surface which is a height from a groove bottom surface of the lateral groove portion decreases in conformity with the inclination of the land-portion inclined surface, a connecting portion where the land-portion inclined surface and the land-portion front surface are connected to each other has a round shape obtained by forming a curved portion convex toward an outer side in the tire radial direction, the connecting portion having the round shape extends in such a way as to substantially coincide with the tire circumferential direction, and an extending direction of one of the connecting portions and an extending direction of another one of the connecting portions adjacent to the one connecting portion coincide with each other.

* * * * *